US008866081B2

(12) United States Patent
Bower et al.

(10) Patent No.: US 8,866,081 B2
(45) Date of Patent: Oct. 21, 2014

(54) HIGH DENSITY FARADAY CUP ARRAY OR OTHER OPEN TRENCH STRUCTURES AND METHOD OF MANUFACTURE THEREOF

(75) Inventors: Christopher A. Bower, Raleigh, NC (US); Kristin Hedgepath Gilchrist, Durham, NC (US); Brian R. Stoner, Chapel Hill, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 751 days.

(21) Appl. No.: 12/921,525

(22) PCT Filed: Feb. 24, 2009

(86) PCT No.: PCT/US2009/034952

§ 371 (c)(1),
(2), (4) Date: Sep. 8, 2010

(87) PCT Pub. No.: WO2009/148642

PCT Pub. Date: Dec. 10, 2009

(65) Prior Publication Data

US 2011/0006204 A1 Jan. 13, 2011

Related U.S. Application Data

(60) Provisional application No. 61/036,844, filed on Mar. 14, 2008.

(51) Int. Cl.
*G01T 1/00* (2006.01)
*H01J 49/02* (2006.01)

(52) U.S. Cl.
CPC .................................... *H01J 49/025* (2013.01)
USPC ....................................................... 250/336.1

(58) Field of Classification Search
USPC .................................... 250/336.1; 333/336.1
See application file for complete search history.

(56) References Cited

U.S. PATENT DOCUMENTS

| | | | | |
|---|---|---|---|---|
| 5,471,059 | A | 11/1995 | Freedman et al. | |
| 6,847,036 | B1 | 1/2005 | Darling et al. | |
| 2004/0041181 | A1 * | 3/2004 | Morgan | 257/295 |
| 2005/0274888 | A1 * | 12/2005 | Darling et al. | 250/305 |

OTHER PUBLICATIONS

Bower et al., Microfabrication of fine-pitch high aspect ratio Faraday cup arrays in silicon, Apr. 1, 2007, Sensors and Actuators, vol. 137, pp. 296-301.*
Gilchrist et al., A Novel Ion Source and Detector for a Miniature Mass Spectrometer, Nov. 17, 2007, IEEE Sensors, pp. 1372-1375.*
U.S. Appl. No. 12/921,508, filed Sep. 8, 2010, Bower, et al.

* cited by examiner

*Primary Examiner* — Christine Sung
(74) *Attorney, Agent, or Firm* — Oblon, Spivak, McClelland, Maier & Neustadt, L.L.P.

(57) ABSTRACT

A detector array and method for making the detector array. The detector array includes a substrate including a plurality of trenches formed therein, and a plurality of collectors electrically isolated from each other, formed on the walls of the trenches, and configured to collect charged particles incident on respective ones of the collectors and to output from the collectors signals indicative of charged particle collection. In the detector array, adjacent ones of the plurality of trenches are disposed in a staggered configuration relative to one another. The method forms in a substrate a plurality of trenches across a surface of the substrate such that adjacent ones of the trenches are in a staggered sequence relative to one another, forms in the plurality of trenches a plurality of collectors, and connects a plurality of electrodes respectively to the collectors.

52 Claims, 12 Drawing Sheets

HIGH DENSITY FARADAY CUP ARRAY OR OTHER OPEN TRENCH STRUCTURES AND METHOD OF MANUFACTURE THEREOF

STATEMENT REGARDING FEDERALLY SPONSORED RESEARCH

The U.S. Government has a paid-up license in this invention and the right in limited circumstances to require the patent owner to license others on reasonable terms as provided for by terms of Contract NNL-04-AA21A from NASA.

CROSS REFERENCE TO RELATED APPLICATIONS

This application is related to U.S. Application Ser. No. 61/036,851, filed on Mar. 14, 2008, entitled "FARADAY CUP ARRAY INTEGRATED WITH A READOUT IC AND METHOD OF MANUFACTURE THEREOF", the entire contents of which are incorporated herein by reference.

BACKGROUND OF THE INVENTION

1. Field of the Invention

This invention is related to a charged particle detector and methods for fabricating and using the electron detector.

2. Description of the Related Art

In general, a Faraday cup is regarded as a simple detector of charged particle beams. A faraday cup typically includes an inner cup concentrically located within a grounded outer cup. Faraday cups are known for their large dynamic range and ability to function in a wide range of environments, including atmospheric pressure. Well designed and shielded Faraday cups have been reported to measure currents down to $10^{-15}$ A, corresponding to $10^4$ charged particles per second. While electron multipliers are more sensitive, Faraday cup detectors provide quantitative charge measurements with high precision and stable performance. For instance, electron multipliers are susceptible to degradation over time due to sputtering of the electron conversion material, and the gain of these detectors can vary depending on the mass of the impending ions.

Faraday cup arrays designed for use in a mass spectrometer have been previously built which included an array of MOS capacitors formed on the interior of high aspect ratio deep etched trenches in n-type silicon. In those designs, the silicon between each cup served to electrically shield cups from their neighbors, enabling low signal cross-talk. Linear arrays of 64, 128 and 256 cups at pitches of 150 μm and 250 μm have been fabricated. The width spacing between the cups was typically limited to 50 μm. Detector arrays have been fabricated where for ion detection metal strip electrodes or MOS capacitors were used.

The following references all of which are incorporated in their entirety by reference describe this work and other background work.

1. D. Bassi, in: G. Scoles (Ed.), Atomic and Molecular Beam Methods, vol. 1, Oxford University Press, New York, 1988, PP. 180-192 (Chapter 8).
2. A. K. Knight, R. P. Sperline, G. M. Hieftje, E. Young, C J. Barinaga, D. W. Koppenaal, M. B. Denton, The development of a micro-Faraday array for ion detection, Int. J. Mass Spectrom. 215 (2002) 13 1-139.
3. R. B. Darling. A. A. Scheidemann, K. N. Bhat, T.-C. Chen, Micromachined Faraday cup 10 array using deep reactive ion etching, Sens. Actuators. A 95 (2002) 84-93.
4. A. A. Scheidemann, R. B. Darling, F. J. Schumacher, A. Isakharov, Faraday cup detector array with electronic multiplexing for multichannel mass spectrometry, J. Vac. Sci. Technol. A 20(3) (2002) 597-604.
5. K. Birkinshaw. Mass spectrum measurement using a one-dimensional focal plane detector, Int. J. Mass Spectrom. 215 (2002) 195-209.
6. D. Nevejans, E. Neefs, S. Kavadias, P. Merken, C Van Hoof The LEDA5 12 integrated 20 circuit anode array for the analog recording of mass spectra, Tnt. J. Mass Spectrom. 215 (2002) 77-87.
7. M. P. Sirtha and M. Wadsworth, Miniature focal plane mass spectrometer with 1000-pixel modified-CCD detector array for direct ion measurement, Rev. Sci. Instrum. 76 (2005) 25 025103.
8. D. W. Koppenaal, C. J. Barinaga, M. B. Denton, R. P. Sperline, G. M. Hiefije, G. D. Schilling, F. J. Andrade, J. H. Barnes, MS Detectors, Anal. Chem. 77(2 1) (2005) 418A-427A.
9. K. Birkinshaw, Deconvolution of mass spectra measured with a non-uniform detector array to give accurate ion abundances, J. Mass Spectrom. 38 (2003) 206-210.
10. G. A. Eiceman, J. A. Stone, Ion Mobility Spectrometers in National Defense, Anal. Chem. 76(21) (2004) 390A-397A.
11. J. Petinarides, M. T. Griffm, R. A. Miller, E. G. Nazarov, A. D. Bashall, Implementation of a new technology for point detection," Chemical and Biological Sensing VI, ed. P. J. Gardner, Proc. SPIE Vol. 5795 (SPIE, Bellingham, Wash., 2005).
12. C. A. Bower, D. Malta, D. Temple, J. E. Robinson, P. R. Coffinan, M. R. Skokan, T. B. Welch, High density vertical interconnects for 3-D integration of silicon integrated circuits, 56th Electronic Components and Technology Conf. Proc., San Diego, Calif. May 30-Jun. 2, 2006.
13. W. F. Beach, C. Lee, D. R. Bassett, T. M. Austin, R. Olson, "Xylylene Polymers", Encyclopedia of Polymer Science and Engineering, 2' ed. (Wiley, New York, 1989), Vol. 17, p. 990-1025.
14. J. F. McDonald, H. T. Lin, H. J. Greub, R. A. Philhower, S. Dabral, Techniques for 50 fabrication of wafer scale interconnections in multichip packages, IEEE Trans. Comp., Hybrids, Manuf. Technol., 12(2) (1989) 195-205.
15. A. C. Adams, C. D. Capio, The deposition of silicon dioxide films at reduced pressure, J. Electrochem. Soc., 126(6) (1979) 1042-1046.
16. K. H. Dietz, Dry Film Photoresist Processing Technology, (Electrochemical Publications, 5 Ltd., Isle of Man, British Isles, 2001).
17. J. A. T. Norman, B. A. Muratore, P. N. Dyer, D. A. Roberts, A. K. Hochberg, L. H. Dubois, A net metal-organic chemical vapor deposition process for selective copper metallization, Mater. Sci. Eng., B 17 (1993), 87-92.
18. U.S. Pat. No. 6,847,036.
19. R. B. Darling, A. A. Scheidemarm, K. N. Bhat. T.-C. Chen, Micromachined Faraday cup array 15 using deep reactive ion etching, Sens. Actuators, A 95 (2002) 84-93.
20. A. A. Scheidemann, R. B. Darling, F. J. Schumacher, A. Isakharov, Faraday cup detector array with electronic multiplexing for multichannel mass spectrometry, J. Vac. Sci. Technol, A 20(3) (2002) 597-604.
21. O. Kornienko, P. T. A. Reilly, W. B. Whitten, and J. M. Ramsey, Anal. Chem. 72, 559 (2000).

22. C. Dong and G. R. Myneni, Appl. Phys. Lett. 84, 5443 (2004).
23. I.-M. Choi and S.-Y. Woo, Appl. Phys. Lett. 87, 173104 (2005).
24. C. Dong and G. R. Myneni, J. Vac. Sci. Technol. A 17, 2026 (1999).
25. B. R. Chalamala, R. H. Reuss, and K. A. Dean, Appl. Phys. Lett. 79, 2648 (2001).
26. C. Bower, W. Zhu, D. Shalom, D. Lopez, L. H. Chen, P. L. Gammel, and S. Jin, Appl. Phys. Lett. 80, 3820 (2002).
27. C. Bower, D. Shalom, W. Zhu, D. Lopez, G. P. Kochanski, P. L. Gammel, and S. Jin, IEEE Trans. Electron Devices 49, 1478 (2002).
28. J. Carter, A. Cowen, B. Hardy, R. Mahadevan, M. Stonefield, and S. Wilcenski, The PolyMUMPS Design Handbook, MEMSCAP Inc., Durham, N.C., 2005 (available at http://www.memscap.com/mumps/documents/PolyMUMPs.DR.v11.pdf).
29. H. Cui, O. Zhou, and B. R. Stoner, J. Appl. Phys. 88, 6072 (2000).
30. C. Bower, O. Zhou, W. Zhu, D. J. Werder, and S. Jin, Appl. Phys. Lett. 77, 2767 (2000).

SUMMARY

In one embodiment of the invention, there is provided a detector array, including a substrate having a plurality of trenches formed therein, and a plurality of collectors electrically isolated from each other, formed on the walls of the trenches. The collectors are configured to collect charged particles incident on respective ones of the collectors and to output from the collectors signals indicative of charged particle collection. Adjacent ones of the plurality of trenches are disposed in a staggered configuration relative to one another.

In one embodiment of the invention, there is provided a method for making a detector array. The method forms in a substrate a plurality of trenches across a surface of the substrate such that adjacent ones of the trenches are in a staggered sequence relative to one another, forms in the plurality of trenches a plurality of collectors, and connects a plurality of electrodes respectively to the collectors.

In one embodiment of the invention, there is provided a system for collecting charged particles. The system includes a detector array configured to collect charged particles. The detector array includes a substrate having a plurality of collectors electrically isolated from each other, formed on the walls of trenches in the substrate, and configured to collect charge particles incident on respective ones of the collectors and to output from the collectors signals indicative of charged particle collection. In the detector array, adjacent ones of the plurality of trenches disposed in a staggered configuration relative to one another.

It is to be understood that both the foregoing general description of the invention and the following detailed description are exemplary, but are not restrictive of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

The invention is directed to the microfabrication of Faraday cup arrays for use as a charged particle or photon detection device. The detector device in one embodiment of the invention includes an array of microfabricated Faraday cups, where each microfabricated Faraday cup acts as an electrically shielded collector of charged particles (electrons or ions).

Figure 1A:
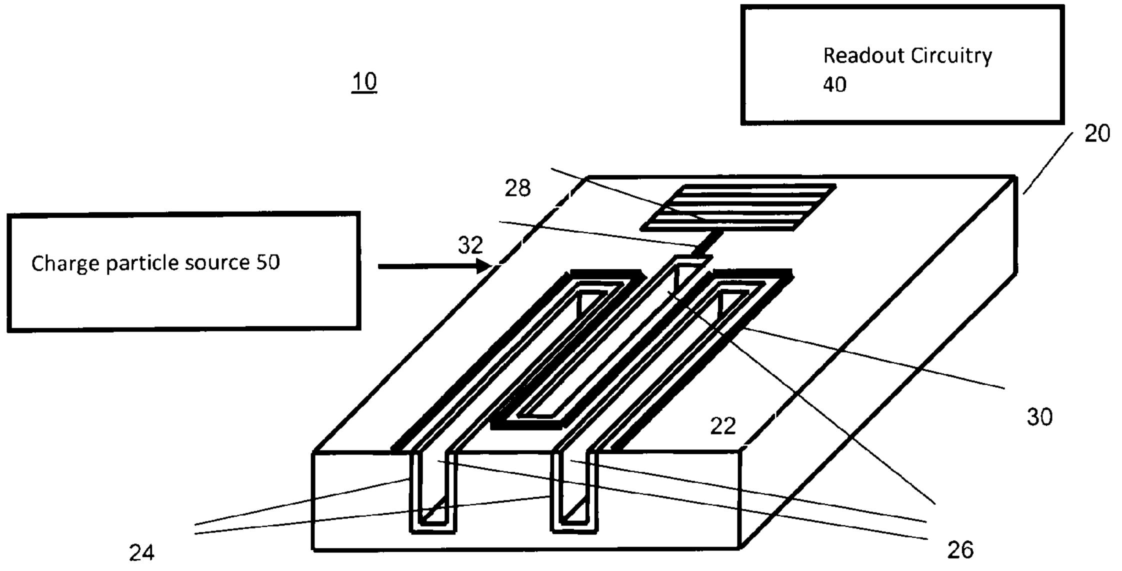
FIG. 1A is a schematic showing one embodiment of the invention of a system for charged particle or photon detection.

Referring now to the drawings, wherein like reference numerals designate identical or corresponding parts throughout the several views, FIG. 1A shows one embodiment of the invention of a system 10 for charged particle or photon detection. The system 10 of FIG. 1A includes a detector array 20 including a substrate 22 having a plurality of collectors 24 formed in the substrate 22 and disposed in sequence across a surface of the substrate 22. FIG. 1A shows trenches 26 formed in the substrate to accommodate the collectors 24. As discussed below, in various embodiments of the invention, the trenches are disposed in a staggered configuration (as shown here and below) and have high aspect ratios. The detector array 20 includes a plurality of electrodes 28 connected respectively to the collectors. For the sake of simplicity only one electrode 28 is shown in FIG. 1A.

The trenches 26 can have widths ranging from 5 μm to 100 μm, and can have lengths up to 10 mm. The trenches 26 can have an aspect ratio ranging from 4:1 to 12:1. The collectors as a group can occupy more than 80%, 90%, or 95% of a surface of the substrate 22. The trenches 26 can form a set of position sensitive detectors. A substrate wall between the trenches can have a thickness less than 50 μm. As a result, the trenches 26 can form a set of high density position sensitive detectors. In one embodiment, as discussed in more detail below, the collectors 24 have an isolation resistance between adjacent ones of the collectors greater than $1\times10^{10}\Omega$. This is accomplished in one embodiment of the invention by the use of an underlying insulator under the collectors 24 (to be discussed in more detail below). The underlying insulator in turn permits the substrate for example to be a low resistivity material (such as Si at $10^{19}$ or $10^{20}$cm$^{-3}$ dopant concentrations or higher) which forms a well defined ground plane for detector array 20.

The collectors 24 can be made of any conductive material including for example copper, aluminum, gold, platinum, and tungsten or combinations thereof. Besides the collectors, FIG. 1A shows a metal layer 30 patterned on the substrate 22 disposed in a vicinity of the collectors 24. FIG. 1A also shows an interconnect 32 connecting the electrodes 28 respectively to the plurality of collectors 24. In one embodiment, the electrodes 28 are in turn connected to (or otherwise in communication with) a readout circuitry 40 for measuring the charge collected in each cup over time (integrated) or as a function of time (instantaneous). The readout circuitry 40 in one embodiment can be included on another chip separate from the chip carrying the detector array 20. In one embodiment, the metal layer 30 serves as a ground reference and/or a suppression grid for the detector array 20.

For example, a suppressor grid can be used in various embodiments to prevent secondary emission from the cup. A suppressor grid is a metal trace that weaves between the Faraday cup collectors. A bias voltage can be applied to the suppressor grid (for example by readout circuitry 40) to prevent the escape of secondary electrons generated inside the cup. The suppressor grid can also serve as an energy filter for incoming charged particles. The metal layer 30 can also be used to generate a ground plane surrounding the interconnect lines 32. The ground plane reduces the crosstalk between adjacent interconnect lines.

The system 10 of FIG. 1A in one embodiment can also include or be connected to a charged particle source 50 which directs charged particles to the detector array 20 where the charged particles are collected by the collectors 24 which act as individual electrodes monitoring the charge accumulation thereon with time. In various embodiments, the charged particle source can include an ion source or an electron source or a combination thereof. In various embodiments, the charged particle source can include a hot filament, a microwave plasma, or other ion sources known in the art which provide an ion into a detector region. In one embodiment, the charged particle source can include an electron-injector material or a photosensitive material disposed in a vicinity of the collectors, which emits an electron (or electrons) as a charged particle or as charged particles upon receiving light or x-ray or high energy particle thereon. For example, the collectors 24 shown in FIG. 1A could themselves contain a coating of photosensitive material or electron injector material. Accordingly, the detector array 10 can be a part of a Faraday cup array, a magnetic sector field detector, a detector in scanning or transmission electron microscope, a charged particle detector, an x-ray detector, a photon detector, and/or a chemical sensor.

In those embodiments, the detector array 20 serves as a positional sensor regarding individual collector currents in time and in position. For example, in a magnetic sector field detector, ions emitted from an ion source can be directed in a direction transverse to the longitudinal axis of the elongated collectors 24 and can be introduced into a magnetic field sector. In the magnetic field sector, the ions will travel along trajectories in the magnetic field which depend on their charge/mass ratio. Lower charge to mass ions are curved the most and will arrive a position along the detector array which for example is closer to the charged particle source than a higher charge to mass ions. The higher charge to mass ions will be incident on and then collected on for example those collectors farther from the charged particle source. Similarly, in a detector in scanning or transmission electron microscope, the detector array also serves as a positional sensor regarding individual collector currents in time and in position. Electrons from the imaging optics are deflected according to their kinetic energy such that lower energy electrons will be more substantially deflected than higher energy electrons. Here, the lower energy electrons will be incident on and then collected on for example those collectors closest to the charged particle source. In optical dispersion devices, light will be diffracted at different angles depending on the wavelength. Lights of different wavelengths will be incident on different regions of the detector array 20. If an electron or charge emitting material on nearby or a part of the collectors, then the electrons or charge generated will be locally collected at nearby collectors.

Further, the readout circuitry 40 can collect and process the charge collection information or signals from individual ones of the collectors 24, not only in a time coordinate (as discussed above) but also in a spatial coordinate for position sensitive information, such as for example in the magnetic sector field detector described above where the respective positions of the individual collectors 24 would be representative of different masses. The readout circuitry 40 can be connected to a microprocessor, memory, and a digital I/O port capable of generating control voltages sufficient to communicate and activate the collectors 24 and the various metal layers on the substrate surface. Moreover, the readout circuitry 40 by way of the microprocessor connection may exchange information to those outside the system 10. The microprocessor (not shown in FIG. 1A) can include computer readable medium containing program instructions for execution to process the data in a temporal and/or spatially integrated or instantaneous manner. The microprocessor may be implemented as a general-purpose computer system that performs a portion or all of the microprocessor based processing steps of the invention in response to executing one or more sequences of one or more instructions contained in a memory. Such instructions may be read into memory from another computer readable medium, such as a hard disk or a removable media drive.

The microprocessor can include at least one computer readable medium or memory, such as the controller memory, for holding instructions programmed according to the teachings of the invention and for containing data structures, tables, records, or other data that may be necessary to implement the invention. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave, or any other medium from which a computer can read.

In one embodiment of the invention, the Faraday cup arrays are made of one-dimensional or elongated Faraday cups. A variety of cup geometries which can be fabricated ranging in width from 15 μm to 45 μm and having lengths up to 4 mm. Larger ranges can be made with the same process. A reasonable minimum width would be 5 μm although there are no substantial restrictions on the minimum width. Furthermore, the cup depth-to-width aspect ratios can exceed 8:1 using deep reactive ion etching technology. In some embodiments, thin silicon membranes between adjacent cups are less than 5 μm wide and 100 μm tall.

Figure 1B:
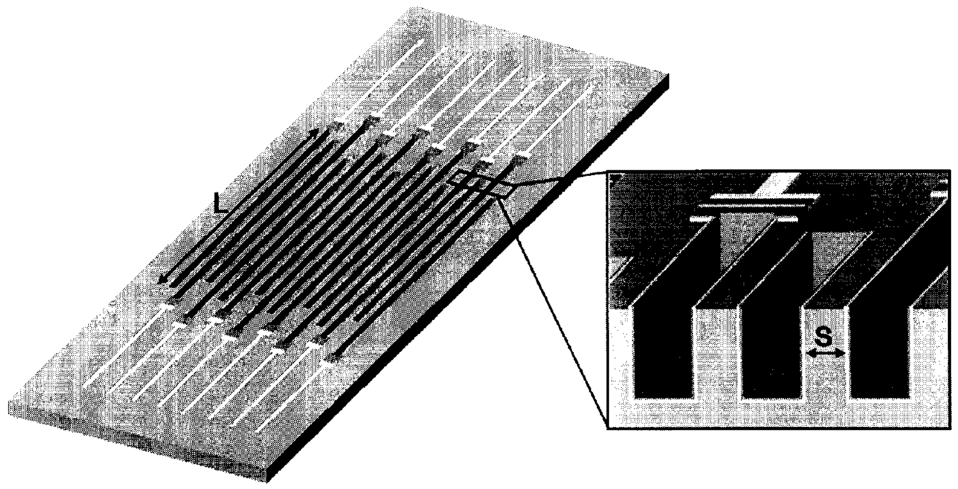
FIG. 1B is a schematic illustration of a three-dimensional model of a 1×16 Faraday cup array according to one embodiment of the invention.

In one embodiment of the invention, the Faraday cup arrays are produced by a novel method which microfabricates fine-pitch linear or two dimensional arrays of the collectors 24. FIG. 1B is a schematic illustration of a three-dimensional model of a 1×16 Faraday cup array according to one embodiment of the invention. In FIG. 1B, the cup design variables are: cup length L, cup depth D, cup width W, and cup-to-cup spacing S. The model shows the cups are arranged in a staggered layout to achieve higher cup density while maintaining a constant cup geometry. The uniformity of the cup-to-cup geometry permits quantitative ion measurements across the array.

Figure 2:
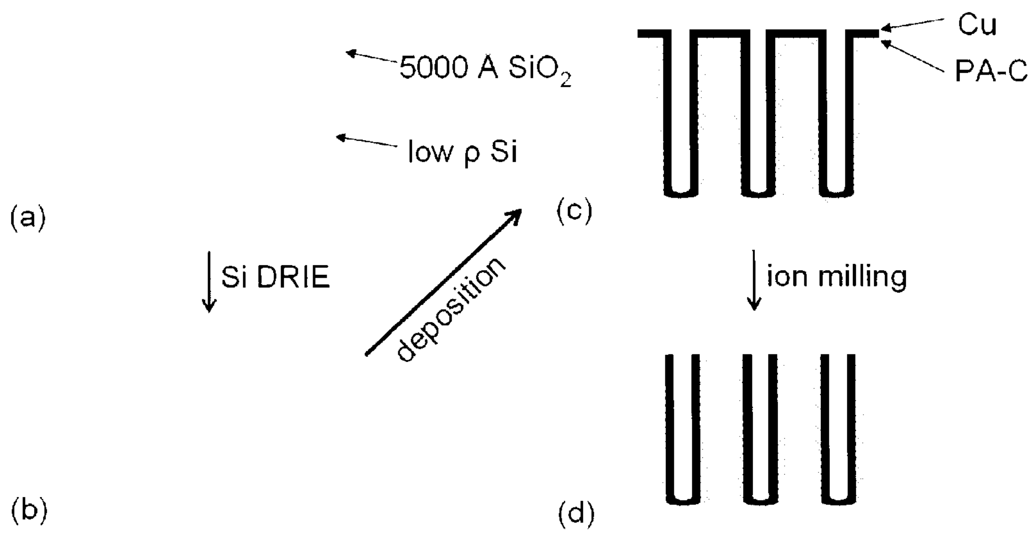
FIG. 2 is a process flow schematic for the Faraday cup fabrication according to one embodiment of the invention.

FIG. 2 is a process flow schematic for the Faraday cup fabrication, according to one embodiment of the invention. This or a similar process flow can be used to fabricate a detector array that has both high resolution (small cups) and large fill factor (small dead space between cups). As shown in FIG. 2, trenches are etched in this example in a silicon substrate using deep reactive ion etching (DRIE). See FIGS. 2*a* to 2*b*. Then, a conformal insulator (e.g., parylene C) is vapor deposited into the trench to serve as electrical insulation. See FIGS. 2*b* to 2*c*. The conformal insulator (as detailed below) is in one embodiment patterned to expose underlying metal interconnect layer(s). Afterwards, as shown in FIG. 2*c*, a conformal collector electrode layer (such as for example Cu) is deposited for example by using metal-organic chemical vapor deposition (MOCVD). Copper as a collector electrode material is discussed below, but other metals and silicides (or combinations thereof) could be used for the collector electrode. The conformal layer fills the trenches and connects through the hole in the conformal insulator to the metal interconnect layer. The copper also deposits on the top surface of the substrate between the trenches. This copper on the top surface (which would electrically short adjacent collector cups) is removed from the top surface of the wafer by argon ion milling, as shown in FIG. 2*d*.

In one embodiment of the invention, the fabrication of a functional cup array includes forming an interconnect by leaving a tab of copper extending from the cup onto the wafer surface and connecting to the pre-existing metal interconnect trace. The numbers for the described device and the described processes below used to make an exemplary Faraday cup array are provide here for an illustrative teaching and do not necessarily limit the invention.

In more detail, a 5000 Å thermal $SiO_2$ layer was formed on boron-doped p-type 100 mm <100> silicon wafers with low resistivity (<0.005 Ohm-cm). A metal trace for connecting between the to-be-formed Faraday cups and bond pads on the periphery of the die was fabricated using electron beam evaporation of Ti (500 Å) and Au (5000 Å) with a photoresist "lift-off" process to generate the interconnection trace pattern on the surface of the substrate.

In one embodiment of the invention, the metal traces which connect to perimeter bonding pads were first patterned because the feature sizes for routing a large number of cups require the use of standard spin-on photoresist. Standard spin-on photoresist procedures cannot be used after deep trenches are etched into the substrate. Afterwards, cup lithography was performed using a positive photoresist. The thermal $SiO_2$ layer on the substrate was etched using reactive ion etching (RIE) prior to etching of the silicon trenches. A standard silicon deep reactive ion etch (DRIE) process using for example an inductively coupled plasma reactor forms trenches of aspect ratios (D/W) from 1:1 to 30:1. Trenches in the range of 4:1 to 12:1 are prototypical of the invention.

Next, a conformal insulator (e.g. parylene) was vapor deposited to a target thickness. Two separate insulator thicknesses (5800 Å and 10,900 Å) of parylene have been demonstrated as suitable for the invention. Parylene-C (PA-C) was chosen for the cup insulator because it is known to make very conformal, uniformly thick and pin-hole free films even in high aspect ratio features. The cup insulator could also be fabricated by chemical vapor deposition of tetraethylorthosilicate (TEOS) which leads to conformal films of silicon dioxide. Following deposition of the conformal insulator, the conformal insulator was patterned to expose the metal interconnection layer.

A laminate dry film photoresist designed for advanced electronic packaging applications (e.g., Dupont MX5000 series) was used to pattern vias in the conformal insulator. The laminate dry film photoresist "tents" or "spans" across the deep etched Faraday cup trenches and does not damage the thin high aspect-ratio silicon membrane that exists between the trenches. An adhesion promotion layer (e.g., a sputtered Ti (500 Å)/Cu (1000 Å) layer) was applied before the laminate in order to increase the adhesion of the laminate dry film to the substrate.

Deposition of a metal such as copper formed the cup metal and electrically connected the Faraday cup to the metal interconnection trace. In order to ensure good contact to the underlying Au trace, a seed layer (e.g. a Ti (500 Å)/Cu (1000 Å) seed layer) was sputtered or otherwise deposited on the substrate following an argon back-sputter process to clean the Au pad. Next, a conformal layer of copper (e.g, 4000 Å Cu layer) was deposited by metal organic chemical vapor deposition (MOCVD) using for example hexafluoroacetylacetonate copper(I) trimethylvinylsilane, Cu(HFAC)(TMVS) as a Cu precursor at 200° C. and 1 Torr. Cu(HFAC)(TMVS) as a Cu precursor is commercially sold by CupraSelect™, Air Products and Chemicals, Inc.

Figure 3:
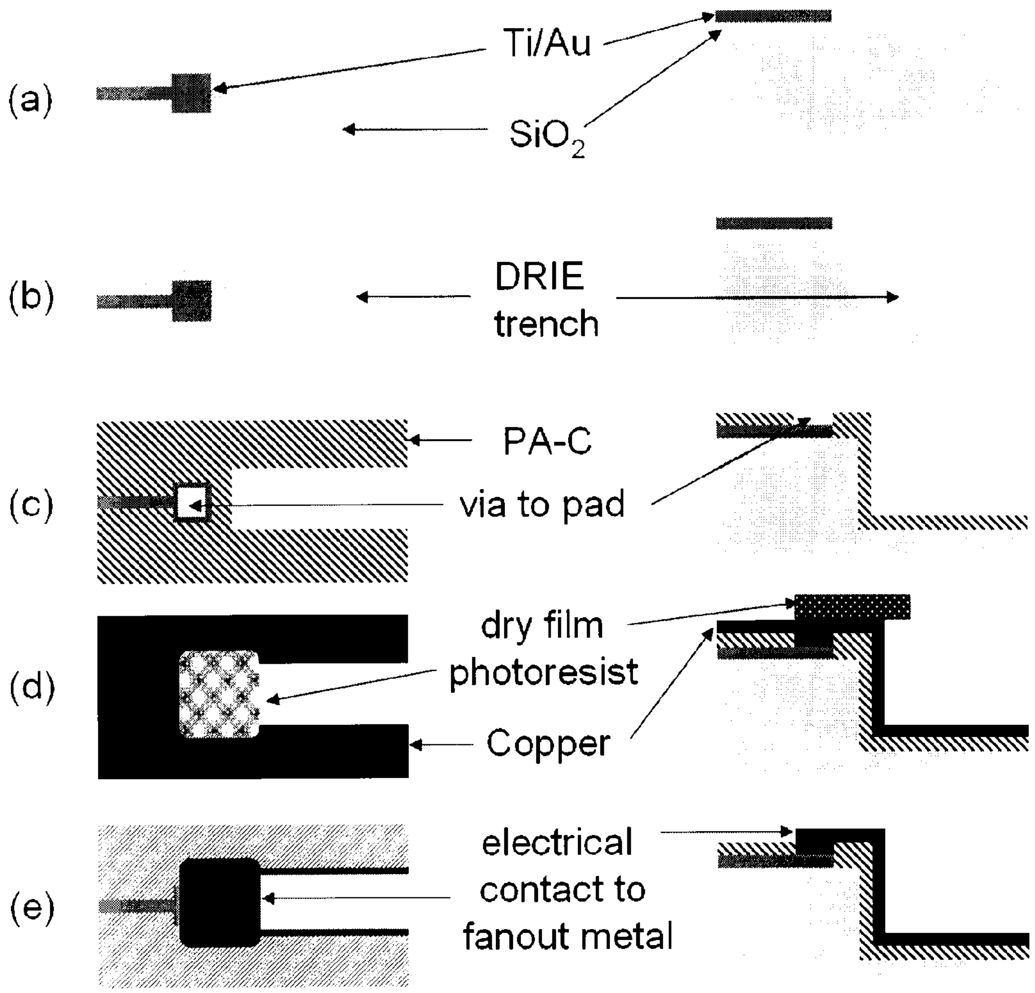
FIG. 3 is a schematic illustration showing top-views (left hand side) and cross-sectional views (right hand side) depicting one method of the invention for fabricating electrical contact to a high aspect ratio deep trench cup of the invention.

FIG. 3 is a schematic illustration showing a top-view and a cross-sectional view depicting one method of the invention for fabricating electrical contact to a high aspect ratio deep trench cup. In particular, FIG. 3 depicts (a) electron-beam evaporation and "lift-off" patterning of a Ti (1000 Å)/Au (1000 Å) trace; (b) DRIE of Si to form the high aspect ratio trench that will become the Faraday cup; (c) deposition of the conformal insulator, and then a dry film lithography sequence to open a via through the parylene using an oxygen RIE process to expose the Au metal pad; (d) conformal deposition of MOCVD copper followed by another dry film lithography sequence where the subsequent dry film (or the second dry film laminate photoresist) "tents" across the edge of the cup; and (e) removal of copper on the top surface of the wafer with an angled argon ion mill process followed by an oxygen RIE step to remove surface parylene in between the cups and to expose the wire-bond pads.

FIGS. 4A-4B are a series of micrographs. FIG. 4A is a SEM micrograph showing a Faraday cup array according to one embodiment of the invention following an ion mill process. The raised features are the second dry film laminate photoresist. FIG. 4B is a higher magnification SEM micrograph showing how the dry film photoresist "tents" across the cup. FIG. 4C is an optical top-view micrograph showing a portion of the Faraday cup array following ion milling and removal of the dry film photoresist. FIG. 4C is a SEM micrograph of the completed cup-to-electrical interconnection.

Figure 4:
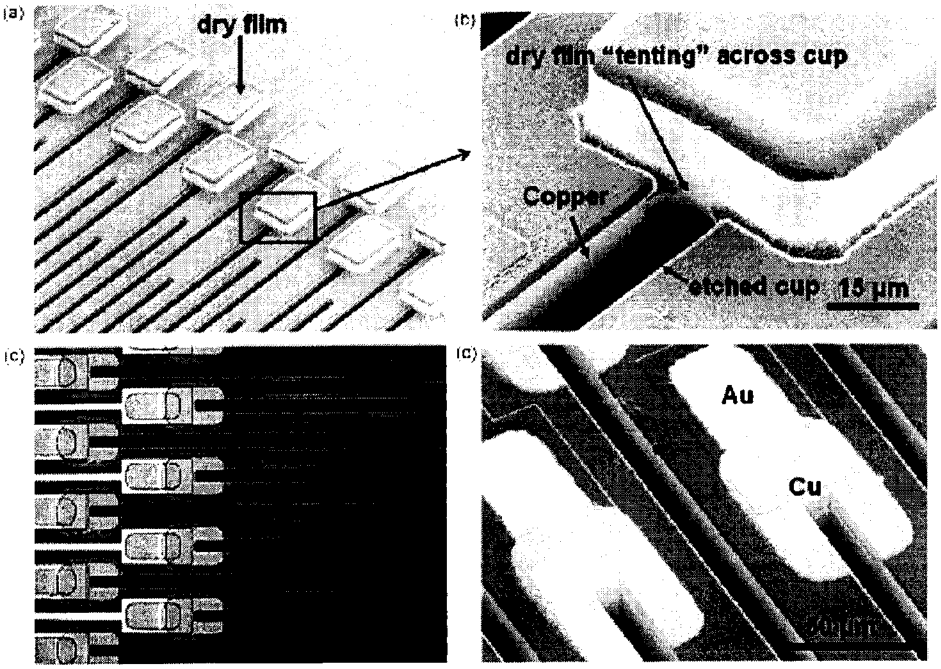
FIG. 4A is a SEM micrograph showing a Faraday cup array according to one embodiment of the invention following an ion mill process.
FIG. 4B is a higher magnification SEM micrograph showing how the dry film photoresist "tents" across the cup according to one embodiment of the invention.
FIG. 4C is an optical top-view micrograph showing a portion of the Faraday cup array according to one embodiment of the invention following ion milling and removal of the dry film photoresist.
FIG. 4D is a SEM micrograph showing a completed cup-to-metal trace electrical interconnection according to one embodiment of the invention.

Argon ion milling can be performed for example at a 30° angle to remove the surface copper without damaging the copper in the cups. Other angles of incidence and inert gas ions are suitable for the invention. The small "tented" block of dry laminate film resist protects the portion of the copper that makes contact to the Au underlying pad during the ion milling. Because the minimum feature size for the dry film photoresist (typically 15 μm lines and spaces) is larger than the desired array pitch, the size of the copper connection tabs can limit the array spacing and therefore the fill factor. This limitation was overcome by arranging the cups in a staggered pattern as illustrated in FIG. 4.

Figure 5:
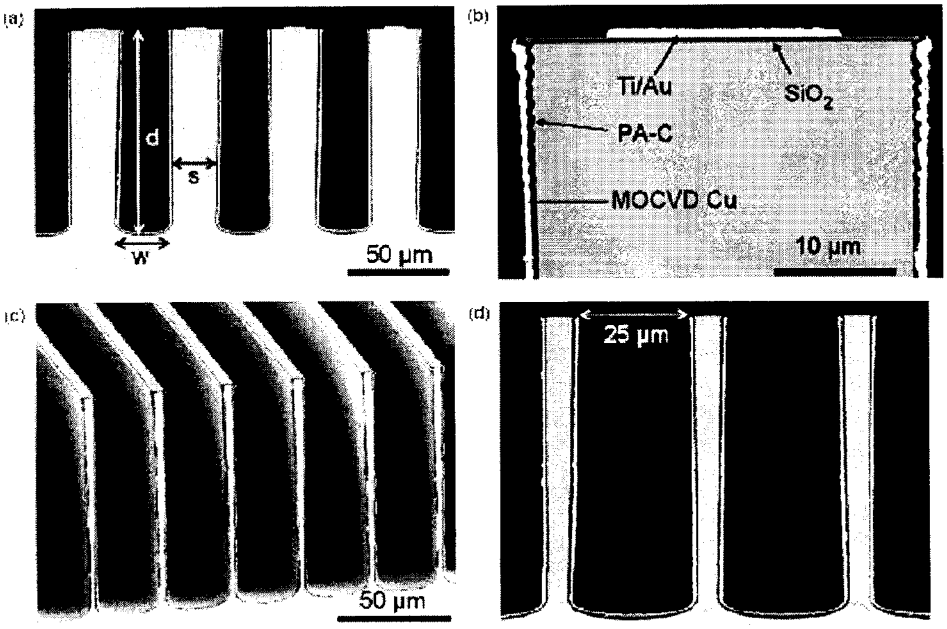
FIG. 5A is a cross-sectional SEM micrograph of Faraday cup array according to one embodiment of the invention.
FIG. 5B is a higher magnification SEM micrograph showing a Ti/Au suppressor grid and conformal parylene and Cu films.
FIG. 5C is a cross-sectional SEM micrograph of a Faraday cup array, according to one embodiment of the invention, showing 25 μm wide cups on a 30 μm pitch, a 83% fill factor.
FIG. 5D is a higher magnification cross sectional SEM micrograph of the Faraday cup array of FIG. 5C.
Figure 6:
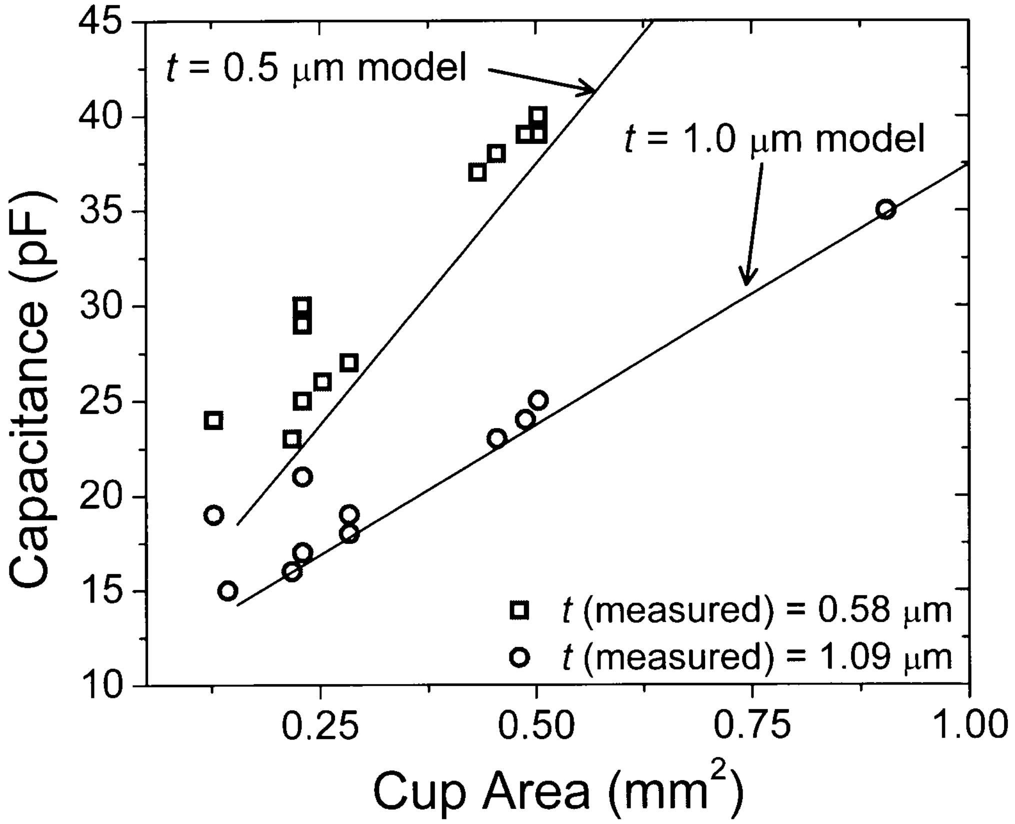
FIG. 6 is a schematic showing measured capacitance values versus cup area in the cup geometries according to the invention.

Accordingly, Faraday cup arrays were fabricated with cup widths ranging from 15 to 45 μm, cup lengths from 1 to 4 mm, and cup-to-cup spacings from 5 to 25 μm. FIG. 5 shows representative cross-sectional SEM micrographs of the Faraday cups according to one embodiment of the invention. In this example, the cup depth d was 100 μm, the cup width w was 25 μm, and the cup-to-cup spacing was 25 μm. From these cross sectional images, it is seen that the DRIE process in this embodiment provides for a slightly reentrant profile, leading to slightly larger cup widths at the base of the cups relative to the top. Using such a DRIE process, the minimum cup-to-cup spacing would be a few microns.

In addition to the geometrical variations, as discussed above, the trace metal layer in one embodiment of the invention forms integrated ground planes and/or suppressor grids on some of the devices. A ground plane serves to reduce the cup-to-cup capacitance of the traces. A suppressor grid is a metal trace which weaves between the Faraday cups. A bias voltage can be applied to the suppressor grid to prevent the escape of secondary electrons generated inside the cup and can also serve as an energy filter for incoming charged particles. Suppressor grid lines 20 μm in width are visible between the cups in FIGS. 5A and 5B. In one embodiment of the invention, since the trace metal layer, including ground and suppressor features, is patterned on the substrate prior to deep cup fabrication, dimensions less than 5 μm are achievable.

While not limited to a specific theory, the microfabricated Faraday cup arrays of the invention are measured and modeled as described hereinafter to provide a better understanding of how various embodiments of the invention function and how feature size impacts such function. The microfabricated Faraday cup arrays were characterized with a combination of theoretical analysis and measurement. For the theoretical analysis a circuit model was implemented in *LTspice/SwitcherCAD III v*2.18 (Linear Technology Corporation). A three-cup circuit model was created with the cups modeled as simple capacitors with a parallel resistance to account for the cup-to-ground leakage. The model also includes cup-to-cup resistance and capacitance to enable an estimation of cross-talk between adjacent cups. A current source was used to simulate ion current. The cup-to-ground capacitance value was modeled as $$C = \frac{\rho_0 \kappa (2Ld + 2dw + Lw)}{l}$$

where κ is the dielectric constant, L, w, and d are the cup length, width, and depth, respectively, and t is the dielectric thickness. The dielectric constant (κ) for parylene is 3.10 at 1 kHz. The cup-to-cup capacitance was modeled using the following equation for a two-wire line:

$$C = \frac{\pi \varepsilon_0}{\ln(2x/t)},$$

where t is the copper thickness and x is the distance between cups. The bodies of the cups are shielded from each other by the grounded low-resistivity silicon. Therefore, top exposed edges of copper are the main contributors to the cup-to-cup capacitance. The device design allows the creation of a ground plane between the traces to minimize the impact of the routing traces on the cup-to-cup capacitance. Traces are the metal lines that connect the cups to bond pads on the die periphery. In the device layout, adjacent cups are routed on different sides of the die. Therefore, the cross-talk due to the routing traces is not seen between adjacent cups, but between cups that are two positions apart.

The cup-to-ground capacitance values were measured with a 4285 precision LCR meter (Agilent Technologies Inc.) with a 1V, 1 kHz signal using metal probe tips to contact the bond pads. For cup-to-ground measurements, a low resistance contact was made to the substrate using colloidal silver. Parallel resistance ($R_p$) values were above the 100 MΩ measurable limit while the dissipation factor was typically below 0.03. The measured capacitance values versus cup area are shown in FIG. 7. The modeled data takes into account the additional capacitance from the wire bond pad and trace. The cup-to-ground capacitance of the wire bond pad and trace were measured on a die without cups, and the added capacitance was typically around 10 pF. The cup-to-cup capacitance was not large enough to be accurately measured with the LCR meter.

Leakage resistance was measured with a S4200 Parametric Test System (Keithley Instruments Inc.) configured with a pre-amplifier for low-current measurement capability. Current was measured in response to a voltage sweep of 1-5V. Measured cup-to-ground resistance values ranged from $3\times10^{11}$ to $3\times10^{12}$ Ω which corresponds to an average resistivity for the parylene of approximately $5\times10^{13}$ Ω-cm. Measured values for cup-to-cup resistance values ranged from $1\times10^{12}$ to $3\times10^{12}$Ω but actual values may be higher as these numbers are approaching the limits of the measurement capability.

Figures 7A, 7B:
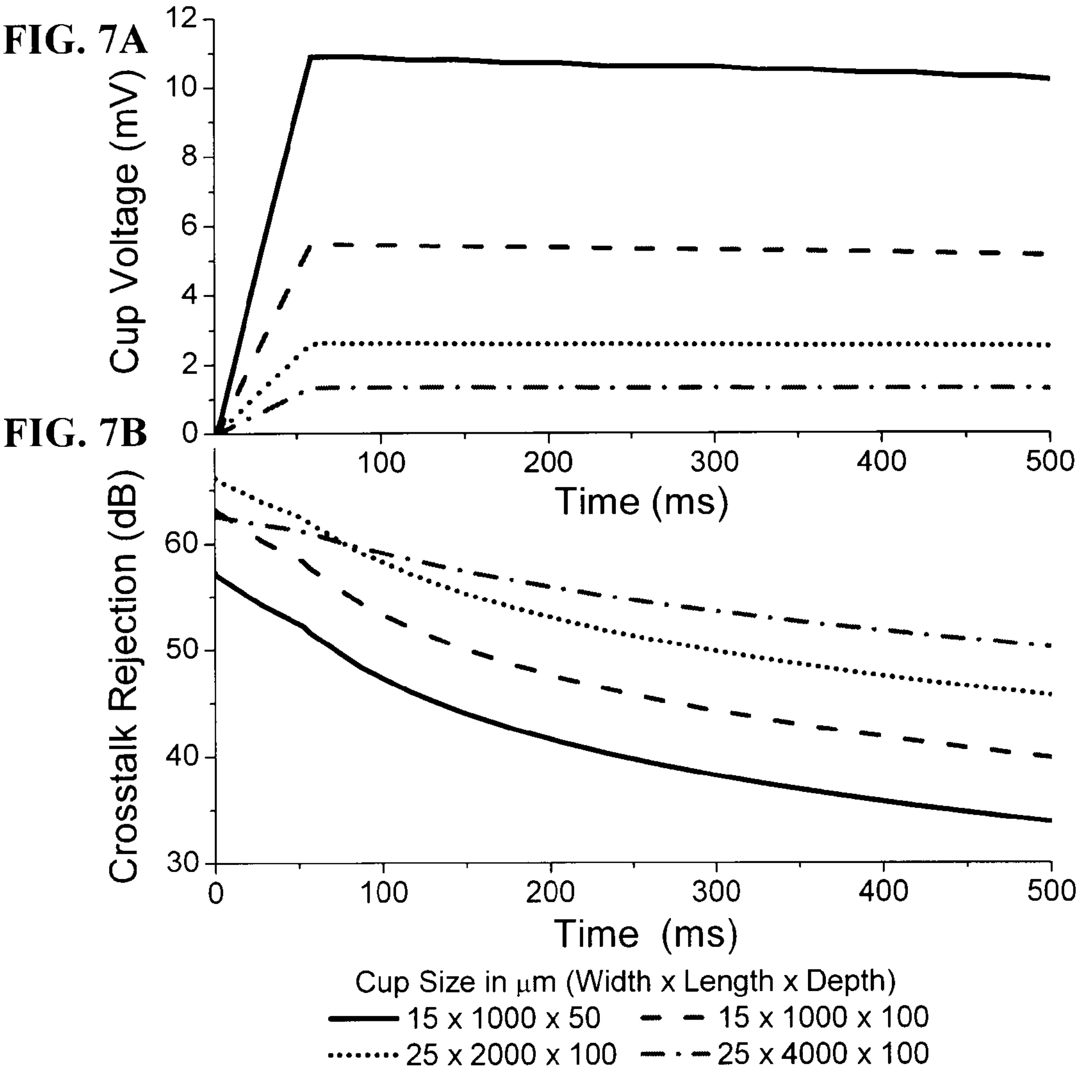
FIG. 7A is a schematic showing voltage responses for various cup geometries according to the invention.
FIG. 7B is a schematic showing theoretical cross-talk rejection ($V_{C2}/V_{C3}$) as a function of time following the charging due to an incident ion beam in the cup geometries according to the invention.

The charge collection performance of the cups was simulated with the Spice model. For these simulations, the cup-to-cup spacing and resistances were held constant at 15 μm and $5\times10^{12}$ Ω, respectively. The geometry dependent cup-to-ground leakage resistors (R1, R2, and R3) were calculated using the measured parylene resistivity. Theoretical values were used for all capacitances based on the cup geometry using the previously described capacitance models. FIG. 7A shows the voltage ($V_{C2}$) in response to a 1 pA, 50 ms input current pulse for various cup geometries. The ability of the cups to hold charge is primarily dependent on the cup-to-ground leakage. The simulation shows that there is a very slow decay of cup voltage with the leakage levels achieved in the fabricated devices.

FIG. 7B shows the theoretical cross-talk rejection ($V_{C2}/V_{C3}$) as a function of time following the charging due to an incident ion beam. The cross-talk is time dependent because there is a delay in the charging of the neighboring cups related to the RC time constants in the device. Therefore, the highest cross-talk rejection is achieved by reading and clearing the cups quickly. The cross-talk between adjacent cups is dependent on both the actual value of the cup-to-ground capacitance and on the ratio between the cup-to-ground capacitance and the cup-to-cup capacitance. Cross-talk is also dependent on leakage resistance, but with the leakage levels achieved in the fabricated devices, the capacitance effects dominate the crosstalk performance.

Figure 8:
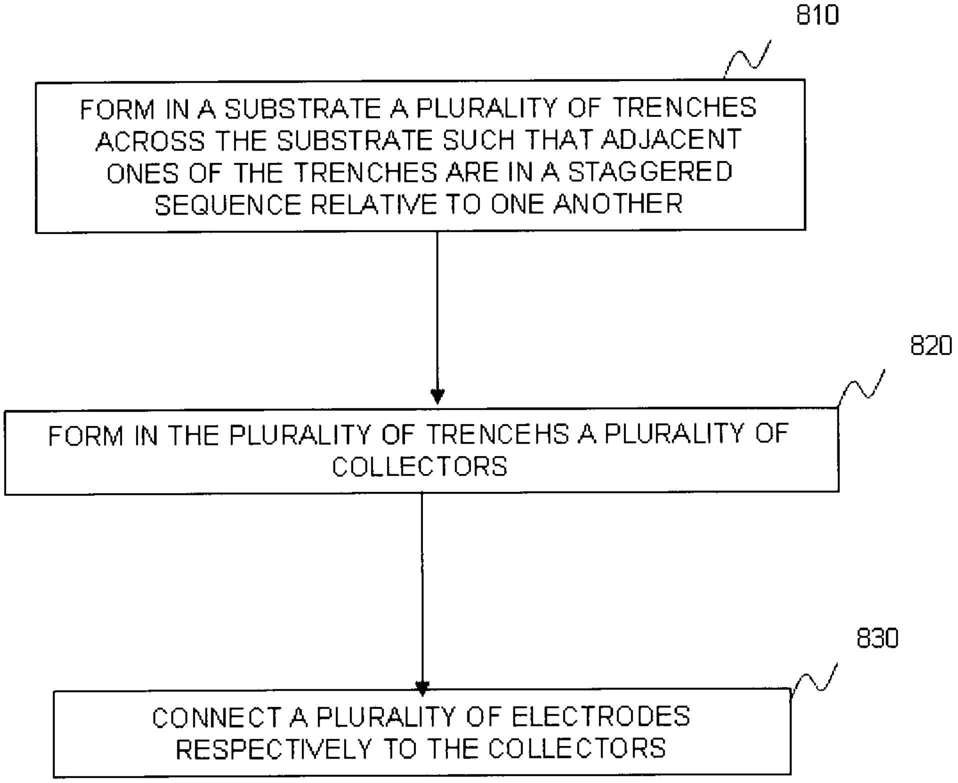
FIG. 8 is a flowchart depicting according to one embodiment of the invention a process for making a detector array.

Thus, it can be understood that the invention in one embodiment provides a method for making a novel detector array. FIG. 8 is a flowchart depicting a process for making the detector array. At 810, a plurality of trenches is formed in a substrate across a surface of the substrate such that adjacent ones of the trenches are in a staggered sequence relative to one another. At 820, a plurality of collectors is formed in the plurality of trenches. At 830, a plurality of electrodes is formed connected respectively to the collectors.

At 810, the trenches can be formed by DRIE of silicon. The trenches can have widths ranging from 5 μm to 100 μm and lengths up to 10 mm. Accordingly, the trenches can have an aspect ratio ranging from 4:1 to 12:1. The trenches can occupy more than 80%, 90%, or 95% of a surface of the substrate. At least two of the trenches can be separated by a wall having a thickness less than 50 μm, or less than 10 μm or less than 5 μm in various embodiments of the invention. At least two of the trenches can have a pitch separation of less than 100 μm, or less than 50 μm or less than 10 μm in various embodiments of the invention.

At 820, the collectors can be formed on an aluminum metal, a copper metal, and/or a metal silicide. At 830, a trace metal layer can be patterned on the substrate between and around the plurality of collectors. The metal layer can function as a ground reference and/or a suppression grid for the detector array. Further, an interconnect can be formed connecting the metal layer respectively to the plurality of collectors, and a readout circuit can be connected to the metal layer for reading signals from respective ones of the plurality of collectors.

Faraday cups or similar detectors have also been used prior to the invention as detectors in traditional magnetic sector mass analyzers. The Faraday cup serves as a single point ion detector and the magnetic field is scanned to collect particles of different mass. A detector arrays allows for simultaneous collection of all masses, leading to a more efficient detector. In one embodiment of the invention, the denser spacing of Faraday cups in the array as compared to previous arrays provides improved accuracy and efficiency for example in ion detector arrays in spectrometers, including spectrometers for isotope abundance measurements.

Faraday cups or similar collectors have also been used prior to the invention as chemical sensors working close to atmospheric pressure and detecting chemical agents based on ion mobility and differential ion mobility detectors. U.S. Pat. No. 6,809,313 (whose contents are incorporated herein by reference) describes the use of metal strip electrodes, not true Faraday cups, for chemical sensors. In one embodiment of the invention, the denser spacing of Faraday cups in the arrays of the invention as compared to previous Faraday cup arrays provides for improved accuracy and efficiency for use in chemical sensors and in ion mobility and differential ion mobility detectors.

Accordingly, in one embodiment of the invention, there is provided a system for charged particle detection. The system includes a detector array configured to collect charged particles. The detector array includes (as discussed in detail above) a substrate including a plurality of trenches formed therein, a plurality of collectors electrically isolated from each other. The collectors formed on the walls of the trenches are configured to collect charge particles incident on respective ones of the collectors. Adjacent ones of the plurality of trenches are disposed in a staggered configuration relative to one another, although in other embodiments the staggered configuration is optional, and the elongated trenches may be aligned or arbitrarily positioned. The system can include a charged particle source (e.g., an ion source or an electron source) for the generation of charged particles.

Figure 9A:
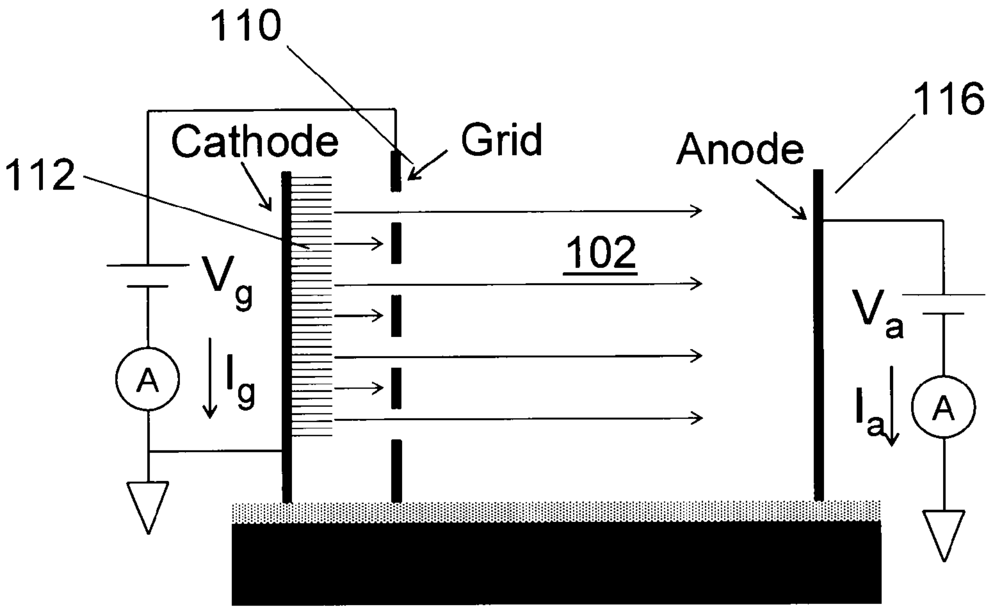
FIG. 9A is a schematic of a triode electron source for one embodiment of the invention.
Figure 9B:
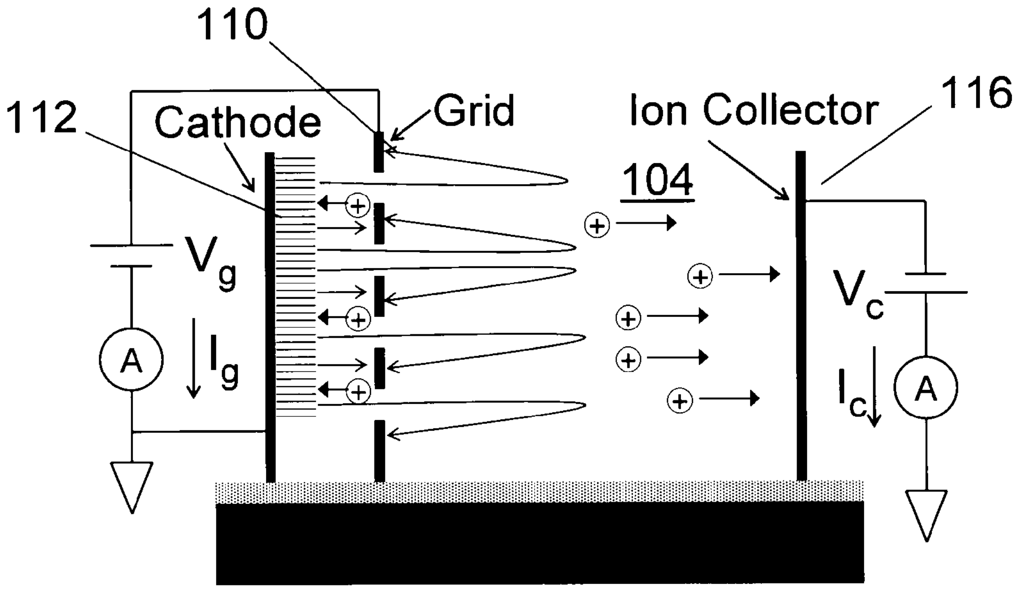
FIG. 9B is a schematic of an ion source using the triode configuration of FIG. 9A.
Figure 10:
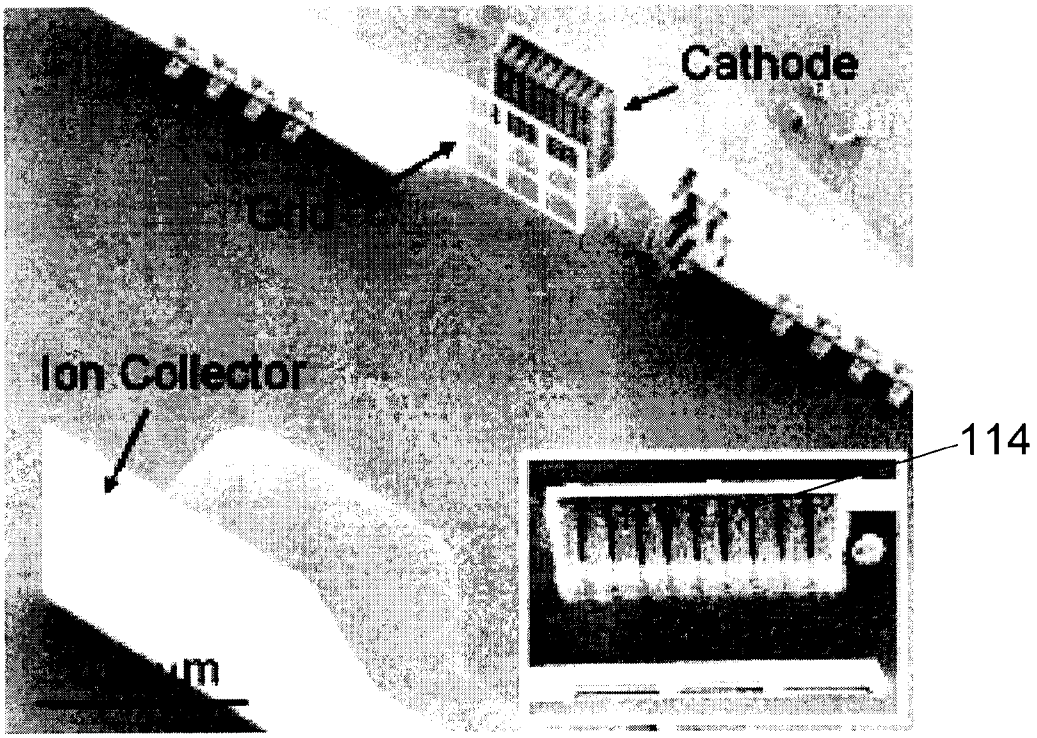
FIG. 10 is a SEM micrograph of an electron impact ion source for one embodiment of the invention.

In one embodiment, the charge particle source can be an electron source 102 or ion source 104 fabricated on a silicon substrate and utilizing for example a carbon nanotube field emission electron source including as shown in FIGS. 9A and 9B a cathode with aligned carbon nanotubes, a control grid, and an collector or extraction electrode. The collector electrode will be discussed below as the collector electrode permits one to build and test an ion source before utilizing such a source as a free-standing or integrated part of a detector array. The extraction electrode which contains a grid or slit will be used to provide a bias so as to extract ions from an ionization region after the control grid. FIG. 9A is a schematic of a triode configuration for one embodiment of the invention for an electron source 102. FIG. 9B is a schematic of an electron-impact ion source 104 using the triode configuration of FIG. 9A. FIG. 10 is a SEM micrograph of a triode that can be operated as an electron source or an electron-impact ion source.

The generation of gas phase ions by electron impact is a common technique in the fields of mass spectrometry and vacuum science. In mass spectrometry, electron-impact sources ionize gas phase analytes prior to mass separation and ion detection. In vacuum science, ion vacuum gauges, residual gas analyzers, and He leak detectors all operate using electron-impact ionization. Thermionic cathodes are reliable and effective for many applications; however, the power consumption associated with heating these cathodes is a major limitation in developing miniature field-portable ion sources. In many emerging applications such as field-portable mass spectrometers; the power required to heat the thermionic electron source could exceed the combined power requirements of all other system components. Therefore, field emission cold cathodes which nominally operate at room temperature are attractive for some electron-impact applications. Workers have evaluated a number of cold cathode materials including for example diamond-coated silicon whiskers for application in an ion trap mass spectrometer, carbon nanotubes (CNTs) and molybdenum tips as an electron source in vacuum ion gauges, and integrated field emitters for electron-impact ionization inside field emission displays. Additional benefits of field emission sources are the fast turn on and the ability to run in a pulsed mode. Thermionic technology does not readily scale down to microdevices, while field emission devices are naturally microscale and have the potential to generate larger emitted current densities.

FIG. 9A depicts a vacuum triode device with both the grid and the anode biased positively with respect to the grounded cathode to provide an electron source 102. FIG. 9B illustrates one embodiment of how electron-impact ionization can be utilized with the same device to serve as an ion source 104. A positively biased grid affects the field emission of electrons from the cathode 112. Some percentage of the emitted electrons passes through the grid apertures 110 into the region between the grid and the negatively biased ion collector 116. The electrons are decelerated by the collector bias and ultimately deflected back towards the grid 110 if the collector voltage is large enough. If an electron-impact ionization event occurs in this region between the grid 110 and the collector 116, the positively charged ion will be accelerated towards the collector electrode. The collector electrode 116 may contain a grid or a slit that enables these ions to pass through for example to a detector array of the invention. If an electron-impact event occurs in the region between the cathode 112 and grid 110, the generated ion will be accelerated into the cathode, possibly damaging the electron emitters.

One illustrative fabrication process by which the ion source of FIG. 10 can be made is described below. More details of the fabrication and the characterization are found in Bower et al, “On-chip electron-impact ion source using carbon nanotube field emitters,” Applied Physics Letters 90, 124102 (2007) published online Mar. 20, 2007, the entire contents of which are incorporated herein by reference.

As described therein, polycrystalline silicon structures that form the device electrodes were initially formed parallel with the substrate surface and embedded in highly doped silicon dioxide. A MEMS foundry such as for example MEMSCAP Inc., Durham, N.C. was used for fabrication of the ion source. After the MEMS fabrication, the sacrificial silicon dioxide was etched in hydrofluoric acid to release the electrode panels. The catalyst for CNT growth, in this example 50 of iron, was selectively evaporated onto the cathode using an integrated shadow mask. The CNTs were grown using microwave plasma chemical vapor deposition with ammonia/methane gas chemistry. Electron microscopy revealed multiwalled CNTs with an average diameter of approximately 30 nm. The CNT length was controlled by varying the growth time. After CNT deposition, the panels were manually rotated and locked in place normal to the substrate using a tongue-in-groove MEMS technique. The device was mounted and wire bonded to a ceramic board for testing. The specific device characterized here has a cathode-to-grid spacing of 50 μm before CNT deposition, a cathode-to-grid spacing of 30 μm after CNT deposition, and a grid-to-collector spacing of 280 μm. The cathode produced was a 70×70 $\mu m^2$ panel and the grid produced was a 3×3 array of 20×20 $\mu m^2$ apertures, with a 2.5 μm grid wire. With this configuration, the electric fields required to generate 1 nA and 1 μA of electron current were 5 and 6 V/μm, respectively. These devices were routinely capable of generating field emitted electron current in excess of 50 μA.

A better understanding of the configuration, the fabrication, and the testing results for the triode ion source described above will be had with reference to the following more detailed discussion. FIG. 9A is a schematic diagram of one embodiment of the triode of the invention, where $V_g$ is the applied grid voltage, $V_a$ is the anode voltage, and $I_a$ is the measured anode current. According to one embodiment of the present invention, the ion source 104 ionizes molecules using either electron impact ionization or field ionization. In the electron impact ionization source of FIG. 9B, the grid electrode 110 is biased positively with respect to the cathode electrode 112 to cause electron emission. Electrons gain kinetic energy based on this voltage and can impact ionize analyte ions in the gas in the vicinity of the grid electrode 110. By way of contrast, in a field ionization source (which the invention can utilize as well and which FIG. 9A can be considered a diagram for provided the biases on the cathode and anode elements were reversed), the grid electrode 110 is biased negatively with respect to the cathode electrode 112. The negative voltage does not promote electron emission but rather generates a high electric field (for example about the carbon nanotubes 114 shown in FIG. 10 (and FIG. 11C) that can field ionize analyte species in the vicinity of the grid electrode 110.

Figure 11A:
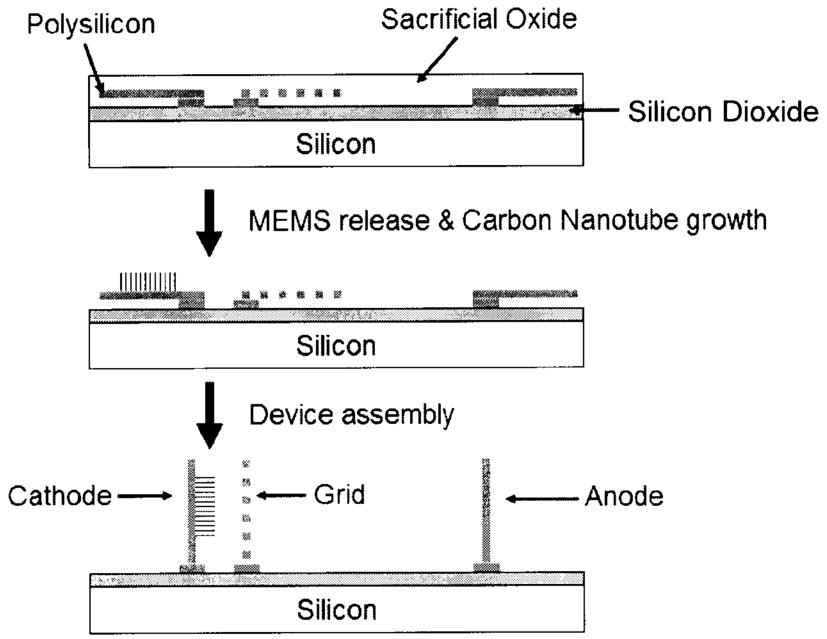
FIG. 11A is a schematic illustrating a process according to one embodiment of the present invention to fabricate the exemplary microtriode ion source of FIG. 10.

FIG. 11A depicts a process to fabricate an exemplary on-chip vacuum microtriode that can be used to implement ion source 104. In this illustrative, non-limiting process, a silicon dioxide layer 128 is thermally grown on a silicon substrate 130 serving as a support of the ion source 104 and the ion collector 106. After which various layers of a sacrificial oxide 132 are deposited using for example plasma enhanced chemical vapor deposition. In this illustrative process, a first sacrificial oxide layer can be deposited, after which the first sacrificial oxide layer is patterned to form holes 134 exposing the underlying silicon dioxide. Polysilicon layer 136 can be deposited using plasma enhanced chemical vapor deposition to cover the first sacrificial oxide layer and fill the holes 134 with polysilicon. The polysilicon layer 136 is patterned to form the structures shown in FIG. 11B including the grid pattern denoted in FIG. 11B and the tapered pattern on the anode electrode 142. A second sacrificial oxide layer can then be deposited over the entire structure. After which, both sacrificial oxide layers are removed to release the polysilicon structures.

Figure 11B:
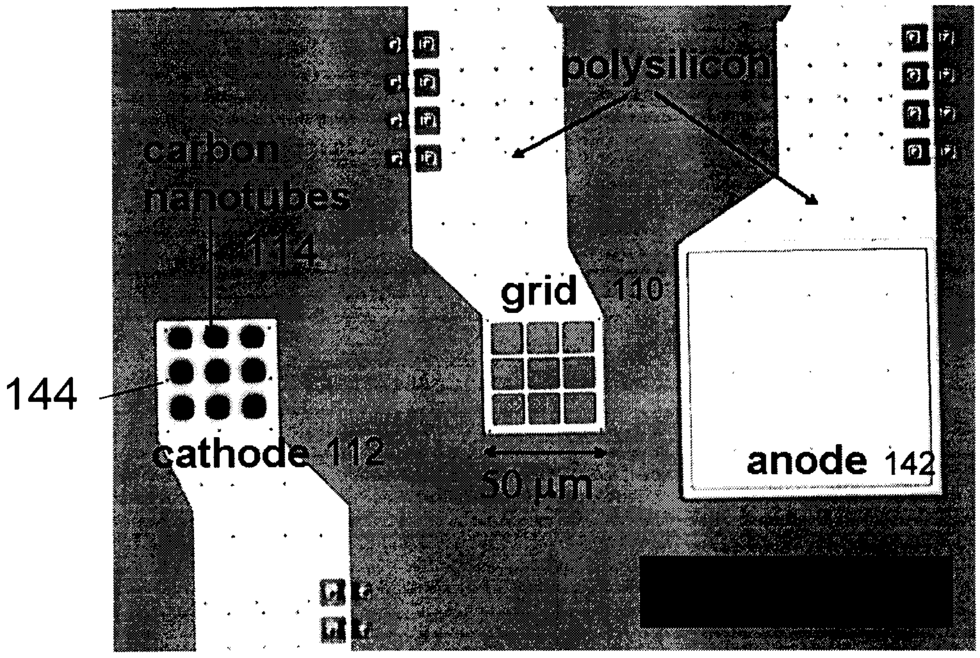
FIG. 11B is an optical micrograph showing a top view of the exemplary microtriode ion source depicted in FIG. 10, prior to release of the anode, cathode, and grid from the underlying silicon substrate.

Carbon nanotubes 114 can then be formed on for example the cathode electrode 144 shown in FIG. 11B, using the techniques for carbon nanotube growth as discussed above. Afterwards, the polysilicon panels can be rotated and locked into place, producing the structure shown in FIG. 11C.

During ionization testing of the triode of FIG. 10, a quantitative measure of the electron current ($I_e$) that passes into the ionization volume is unavailable because all of the emitted electrons are eventually captured by the grid. However, the measured grid current ($I_g$) should be proportional to the electron current ($I_e$) during electron-impact ionization ($I_g \alpha I_e$). In a He atmosphere, the emitted electron current (measured at both $10^{-5}$ Torr and 50 mTorr) did not exhibit a strong dependence on gas pressure. The ion current did increase as He chamber pressure increased, as expected from electron-impact theory. At the chamber base pressure the measured ion collector current is less than 10 pA, while at a pressure of 50 mTorr the ion current approaches 100 nA, representing four orders of magnitude change. The ion current began to saturate as the grid voltage was increased. Other gasses such as Ar and Xe also showed similar performance, with these larger gasses exhibiting larger ratios of collector current to grid current.

These results show the viability of this on-chip ion source as an ion source for a system utilizing the Faraday cup arrays of the invention.

Figure 12:
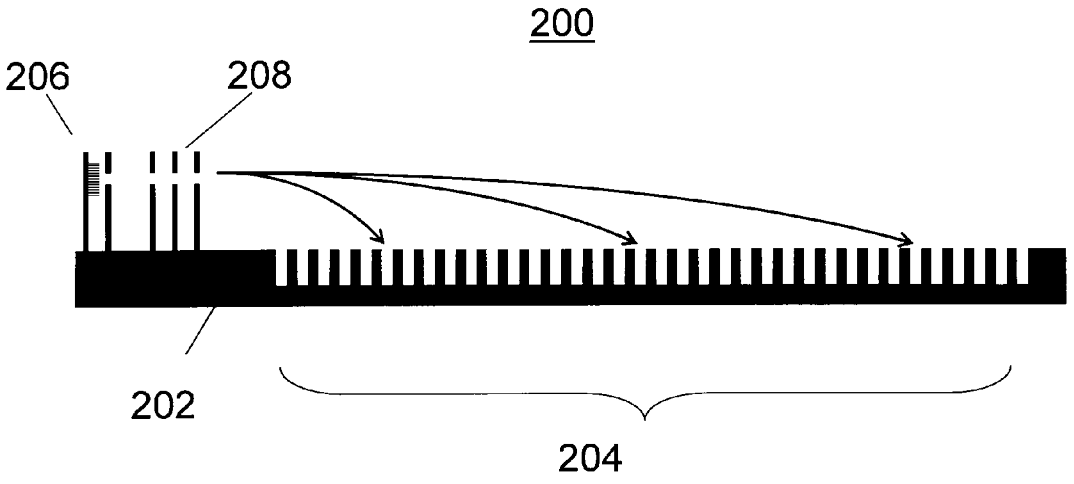
FIG. 12 is a schematic of an integrated ion source and detector array according to one embodiment of the invention.

FIG. 12 is a schematic of an integrated ion source and detector array according to one embodiment of the invention. In this embodiment, an ion source such as ion source 104 is formed on a portion of substrate 202 removed from the trenches and collectors. Alternatively, the ion source 104 could be attached to a portion of substrate 202 removed from the trenches and collectors. FIG. 12 depicts a detector array 200 including substrate 202 having a plurality of trenches 204 formed therein and disposed for example in sequence across a surface of substrate 202.

A plurality of collectors (not explicitly shown in this depiction) are disposed in the trenches 204. The collectors as in the other embodiments can collect charged particles incident on respective ones of the collectors and to output from the collectors signals indicative of charged particle collection. As shown in FIG. 12, the integrated ion source 206 is fabricated on a portion of the substrate removed from the trenches 204.

The ion source by way of grids 208 can direct ions across the detector array 200. For example, a magnetic field sector (not shown as the magnetic field lines permeate the structure shown in FIG. 12) can deflect the ions along different trajectories to impinge the ions on different ones of the collectors depending on a charge-to-mass ratio of the ions.

Figure 11C:
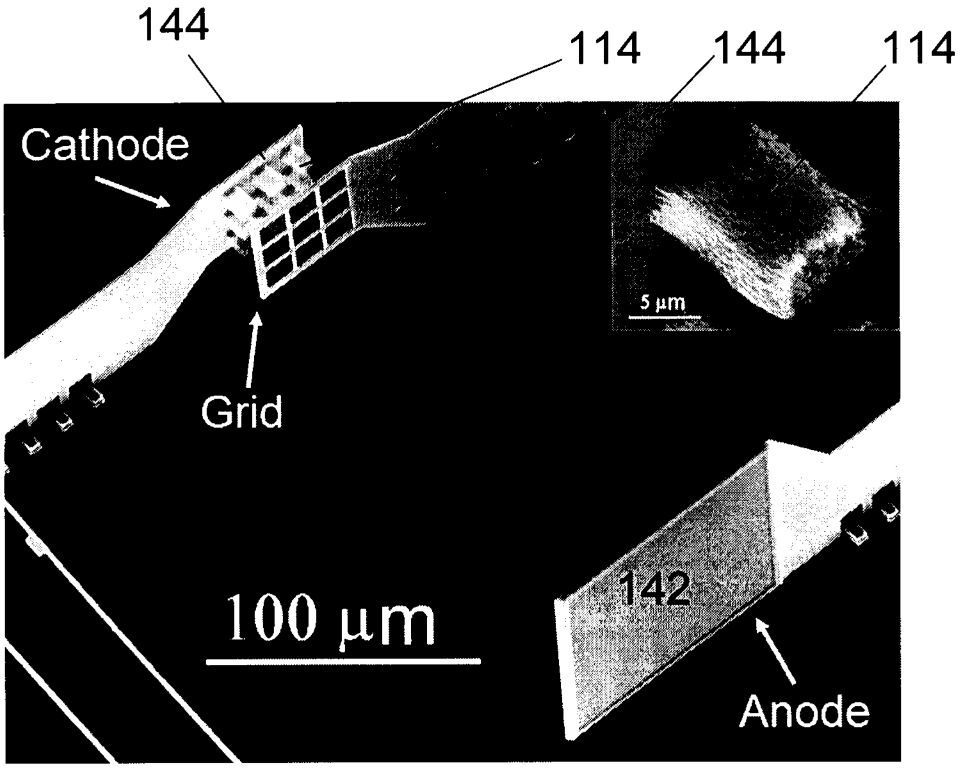
FIG. 11C is an electron micrograph of the exemplary microtriode ion source depicted in FIG. 10.

Ion source 206 can include an electrode (e.g., a cathode) including a carbon nanotube as shown in FIG. 11C. The carbon nanotube can be disposed on an electrode support spacing the carbon nanotube a distance above a surface of the substrate. The electrode as in other embodiments can be configured to field ionize or electron impact ionize a gas phase analyte in a vicinity of the electrode. Grids 208 in ion source 206 can be configured to be an acceleration grid directing ions across the detector array 200. Ion source 206 can be configured as in other embodiments to generate ion beams by selectively using electron impact ionization or direct field ionization.

Numerous modifications and variations of the invention are possible in light of the above teachings. It is therefore to be understood that within the scope of the appended claims, the invention may be practiced otherwise than as specifically described herein.

The invention claimed is:

1. A detector array comprising:

a substrate including a plurality of trenches formed therein;

a plurality of collectors electrically isolated from each other, formed on walls of the trenches, and configured to collect charged particles incident on respective ones of the collectors and to output from said collectors signals indicative of charged particle collection;

adjacent ones of said plurality of trenches disposed in a staggered configuration relative to one another;

contact electrodes connected to respective ones of the collectors at outermost ends of the collectors;

said contact electrodes having a width larger than a width of the collectors; and adjacent ones of said contact electrodes disposed offset from each other in a longitudinal direction of the collectors in order to reduce a spacing between adjacent collectors while avoiding electrical shorting of said adjacent ones of the contact electrodes.

2. The array of claim 1, further comprising:

lead lines extending from the collector contact electrodes to a periphery of the substrate to provide said signal indicative of said charged particle collection to readout circuitry for collection and processing of said signals indicative of charged particle collection.

3. The array of claim 1, wherein the trenches comprise widths ranging from 5 μm to 100 μm and having lengths up to 10 mm.

4. The array of claim 1, wherein the trenches comprise an aspect ratio ranging from 4:1 to 12:1.

5. The array of claim 1, wherein the plurality of collectors occupies more than 80% of a surface of the substrate.

6. The array of claim 1, wherein the plurality of collectors occupies more than 90% of a surface of the substrate.

7. The array of claim 1, wherein the plurality of collectors occupies more than 95% of a surface of the substrate.

8. The array of claim 1, wherein the collectors comprise an array of position sensitive detectors.

9. The array of claim 1, wherein the collectors comprise at least one of copper, aluminum, gold, platinum, and tungsten.

10. The array of claim 1, further comprising:

a metal layer patterned on the substrate disposed in a vicinity of the collectors.

11. The array of claim 10, further comprising an interconnect connecting the metal layer respectively to the plurality of collectors.

12. The array of claim 10, wherein the metal layer includes at least one of a ground reference and a suppression grid for the detector array.

13. The array of claim 1, further comprising:

an electron-injector material disposed in a vicinity of the collectors and configured to emit an electron as the charged particle upon receiving light or x-ray thereon.

14. The array of claim 1, wherein a substrate wall between the trenches has a thickness less than 50 μm.

15. The array of claim 1, wherein the collectors have an isolation resistance between adjacent ones of the collectors greater than $1\times10^{10}\Omega$.

16. The array of claim 1, wherein the plurality of collectors comprise a component of at least one of a Faraday cup array, a detector for a magnetic sector field detector, detectors in scanning or transmission electron microscope, a charged particle detector, an x-ray detector, a photon detector, and a detector in an ion mobility spectrometer.

17. A method for making a detector array, comprising:

forming in a substrate a plurality of trenches across a surface of the substrate such that adjacent ones of the trenches are in a staggered sequence relative to one another;

forming in the plurality of trenches a plurality of collectors;

connecting a plurality of electrodes respectively to the collectors; and patterning a metal layer on the substrate in a vicinity of the collectors, wherein patterning comprises:

forming contact electrodes connected to respective ones of the collectors at outermost ends of the collectors, said contact electrodes having a width larger than a width of the collectors.

18. The method of claim 17, further comprising:

forming, with an ion mill process, the plurality of trenches; and utilizing a dry film photoresist spanning across one or more the trenches to protect conductive electrode materials from the ion mill process forming the trenches.

19. The method of claim 18, further comprising:

utilizing a laminate photoresist to pattern electrical connections on the substrate for connection to the collectors.

20. The method of claim 18, wherein forming the trenches comprises:

etching the trenches using a deep reactive ion etch.

21. The method of claim 18, wherein forming the trenches comprises:

forming said trenches having widths ranging from 5 μm to 100 μm and lengths up to 10 mm.

22. The method of claim 18, wherein forming the trenches comprises:

forming said trenches having an aspect ratio of depth to width ranging from 4:1 to 12:1.

23. The method of claim 18, wherein forming the trenches comprises:

forming said trenches to occupy more than 80% of a surface of the substrate.

24. The method of claim 18, wherein forming the trenches comprises:

forming said trenches to occupy more than 90% of a surface of the substrate.

25. The method of claim 18, wherein forming the trenches comprises:

forming said trenches to occupy more than 95% of a surface of the substrate.

26. The method of claim 18, wherein forming the trenches comprises:

leaving a substrate wall between the trenches of a thickness less than 50 μm.

27. The method of claim 18, wherein forming the collectors comprises:

forming collectors of at least one of copper, aluminum, gold, platinum, and tungsten.

28. The method of claim 18, further comprising:

patterning a metal layer on the substrate in a vicinity of the collectors.

29. The method of claim 28, further comprising:

forming an interconnect connecting the metal layer respectively to the plurality of collectors.

30. The method of claim 17, wherein forming contact electrodes comprises:

forming the contact electrodes such that adjacent ones of said contact electrodes are disposed offset from each other in a longitudinal direction of the collectors in order to reduce a spacing between adjacent collectors while avoiding electrical shorting of said adjacent ones of the contact electrodes.

31. A system for charged particle detection, comprising:

a detector array configured to collect charged particles; said detector array including, a substrate including a plurality of trenches formed therein;

a plurality of collectors electrically isolated from each other, formed on walls of the trenches, and configured to collect charged particles incident on respective ones of the collectors and to output from said collectors signals indicative of charged particle collection, adjacent ones of said plurality of trenches disposed in a staggered configuration relative to one another;

contact electrodes connected to respective ones of the collectors at outermost ends of the collectors;

said contact electrodes having a width larger than a width of the collectors; and adjacent ones of said contact electrodes disposed offset from each other in a longitudinal direction of the collectors in order to reduce a spacing between adjacent collectors while avoiding electrical shorting of said adjacent ones of the contact electrodes.

32. The system of claim 31, further comprising:

a charged particle source including at least one of an ion source and an electron source.

33. The system of claim 31, further comprising:

an electron-injector material disposed in the plurality of trenches and configured to emit an electron upon receiving a high energy particle thereon.

34. The system of claim 31, wherein the plurality of collectors comprise a component of at least one of a Faraday cup array, a magnetic sector field detector, detectors in a scanning or transmission electron microscope, a charged particle detector, an x-ray detector, a photon detector, and a chemical sensor.

35. A detector array comprising:

a substrate including a plurality of elongated trenches formed in the substrate and disposed in sequence across a surface of the substrate;

a plurality of collectors disposed in the elongated trenches, said collectors configured to collect charged particles incident on respective ones of the collectors and to output from said collectors signals indicative of charged particle collection;

a wall membrane of the substrate separating the elongated trenches by a distance less than 50 μm;

contact electrodes connected to respective ones of the collectors at outermost ends of the collectors;

said contact electrodes having a width larger than a width of the collectors; and adjacent ones of said contact electrodes disposed offset from each other in a longitudinal direction of the collectors in order to reduce a spacing between adjacent collectors while avoiding electrical shorting of said adjacent ones of the contact electrodes.

36. The array of claim 35, wherein said distance is less than 10 μm.

37. The array of claim 35, wherein said distance is less than 5 μm.

38. The array of claim 35, wherein said elongated trenches have widths ranging from 5 μm to 100 μm and have lengths up to 10 mm.

39. The array of claim 35, wherein said elongated trenches have an aspect ratio of depth to width ranging from 4:1 to 12:1.

40. A detector array comprising:

a substrate including a plurality of elongated trenches formed in the substrate and disposed in sequence across a surface of the substrate;

a plurality of collectors disposed in the elongated trenches, said collectors configured to collect charged particles incident on respective ones of the collectors and to output from said collectors signals indicative of charged particle collection;

at least two of the elongated trenches separated from each other by a pitch of less than 100 μm;

contact electrodes connected to respective ones of the collectors at outermost ends of the collectors;

said contact electrodes having a width larger than a width of the collectors; and adjacent ones of said contact electrodes disposed offset from each other in a longitudinal direction of the collectors in order to reduce a spacing between adjacent collectors while avoiding electrical shorting of said adjacent ones of the contact electrodes.

41. The array of claim 40, wherein said pitch is less than 50 μm.

42. The array of claim 40, wherein said pitch is less than 10 μm.

43. The array of claim 40, wherein said elongated trenches have widths ranging from 5 μm to 100 μm and have lengths up to 10 mm.

44. A detector array comprising:

a substrate including a plurality of trenches formed in the substrate and disposed in sequence across a surface of the substrate;

a plurality of collectors disposed in the trenches, said collectors configured to collect charged particles incident on respective ones of the collectors and to output from said collectors signals indicative of charged particle collection; and an ion source fabricated on a portion of the substrate removed from the trenches.

45. The array of claim 44, wherein the ion source is configured to direct ions across the detector array so as to impinge the ions on different ones of the collectors based on respective charge-to-mass ratios of the ions.

46. The system of claim 45, further comprising:

a magnetic field sector configured to deflect the ions along different trajectories so as to impinge the ions on different ones of the collectors depending on a charge-to-mass ratio of the ions.

47. The array of claim 44, wherein the ion source comprises at least one electrode.

48. The array of claim 47, wherein the at least one electrode comprises a carbon nanotube disposed on an electrode support spacing said carbon nanotube a distance above a surface of the substrate.

49. The array of claim 47, wherein the at least one electrode is configured to field ionize or electron impact ionize a gas phase analyte in a vicinity of the electrode.

50. The array of claim 44, wherein the ion source comprises at least one acceleration grid configured to direct ions across the detector array.

51. The array of claim 44, wherein the ion source comprises at least one of an electron impact ionization source and a field ionization source.

52. The array of claim 51, wherein the ion source is configured to generate ion beams by selectively using electron impact ionization or direct field ionization.

* * * * *